(12) United States Patent
Obata et al.

(10) Patent No.: US 6,912,394 B1
(45) Date of Patent: Jun. 28, 2005

(54) RADIO LINE ALLOCATION JUDGING METHOD IN MOBILE COMMUNICATION SYSTEM AND RADIO LINE

(75) Inventors: Kazunori Obata, Kanagawa (JP); Akihiro Maebara, Kanagawa (JP); Tooru Nakamura, Kanagawa (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 09/647,920

(22) PCT Filed: Feb. 16, 2000

(86) PCT No.: PCT/JP00/00846

§ 371 (c)(1),
(2), (4) Date: Oct. 13, 2000

(87) PCT Pub. No.: WO00/49823

PCT Pub. Date: Aug. 24, 2000

(30) Foreign Application Priority Data

Feb. 16, 1999 (JP) .......................................... P11-037523
Feb. 26, 1999 (JP) .......................................... P11-51227

(51) Int. Cl.[7] .............................................. H04Q 7/20
(52) U.S. Cl. .................... 455/450; 455/452.2; 455/451; 455/464; 455/513; 370/252; 370/280; 370/329
(58) Field of Search .............................. 455/452.2, 451, 455/450, 464, 513; 370/252, 280, 329

(56) References Cited

U.S. PATENT DOCUMENTS 5,448,761 A * 9/1995 Ushirokawa ................. 455/62
5,838,671 A * 11/1998 Ishikawa et al. ............ 370/335
5,903,843 A * 5/1999 Suzuki et al. .............. 455/452.2
5,953,661 A * 9/1999 Schwinghammer et al. 455/423
6,041,238 A * 3/2000 Tanoue ..................... 455/452.2

* cited by examiner

Primary Examiner—David Hudspeth
Assistant Examiner—S. Smith
(74) Attorney, Agent, or Firm—Oblon, Spivak, McClelland, Maier & Neustadt, P.C.

(57) ABSTRACT

A radio channel assignment judgement method and a radio channel control device in a mobile communication system, capable of preventing a rapid tolerance degradation with respect to the identical frequency interference associated with a degradation of a receiving level of a communication channel that is caused, for example, by a moving of the mobile station, are disclosed. Upon receiving a communication request from a mobile station along with a measurement result of a receiving level of a level measurement channel, an unused assignment candidate frequency/radio channel is selected while a carrier-to-interference ratio (CIR) that is corresponding to this receiving level is determined from a table, a measurement result of an interference receiving level of the assignment candidate frequency/radio channel is acquired from the mobile station, whether this interference receiving level satisfies the carrier-to-interference ratio (CIR) selected from the table or not is judged, and a selected frequency/radio channel is assigned if it is satisfied.

10 Claims, 7 Drawing Sheets

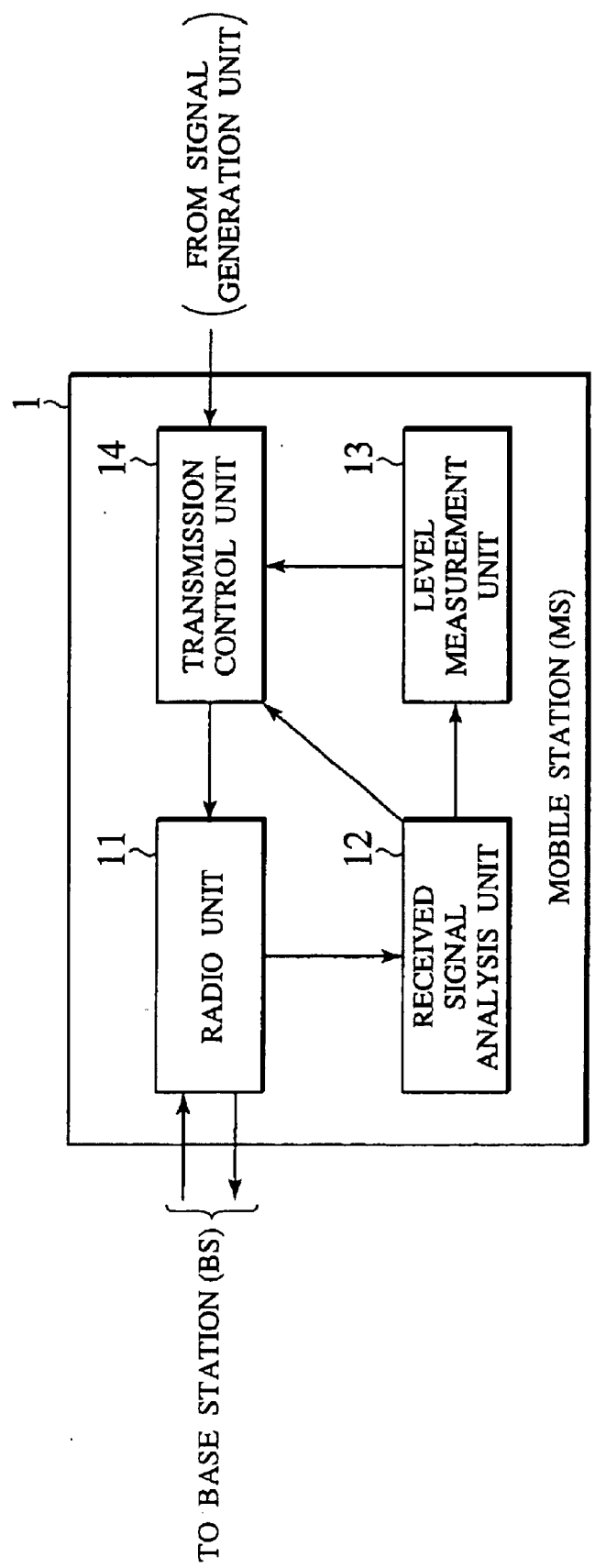

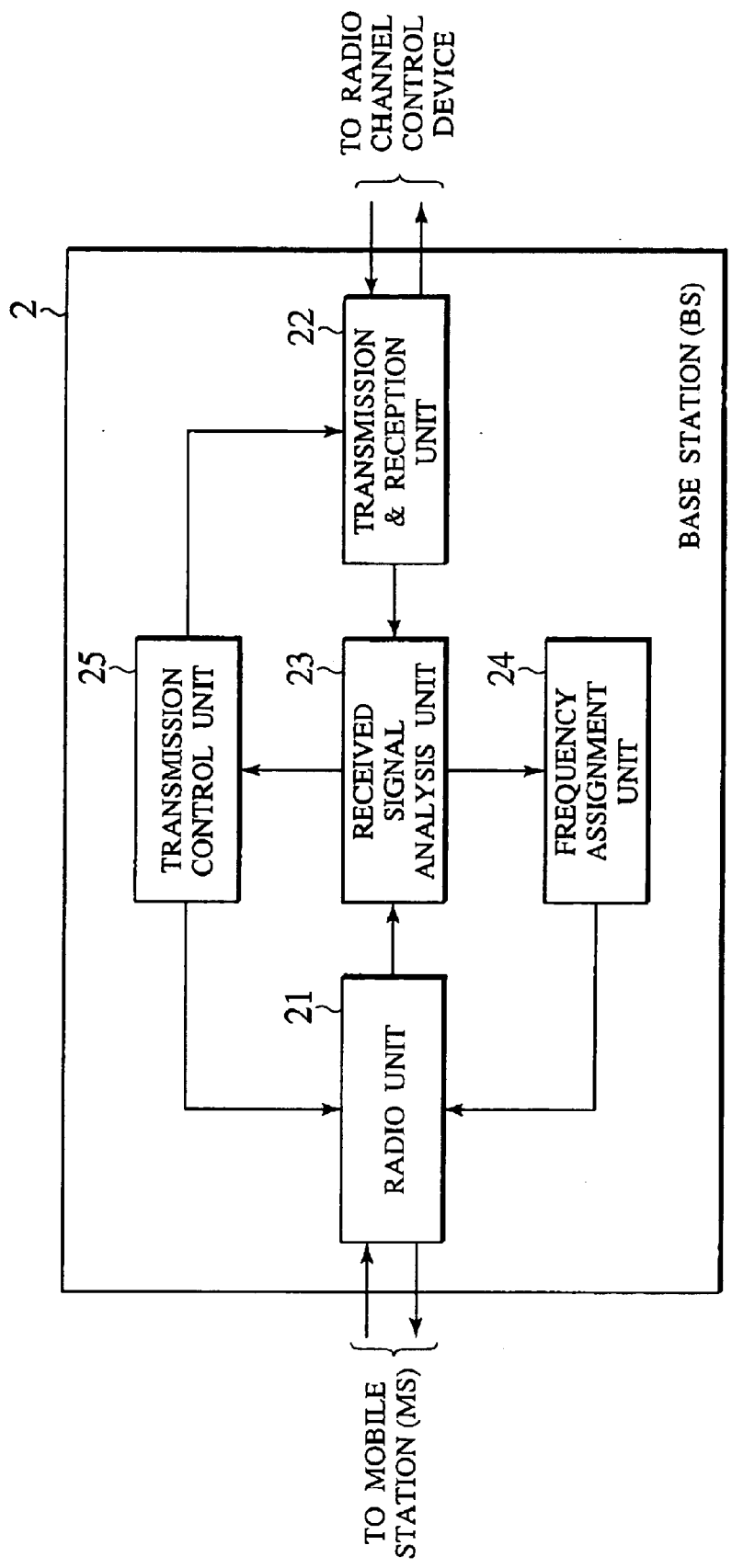

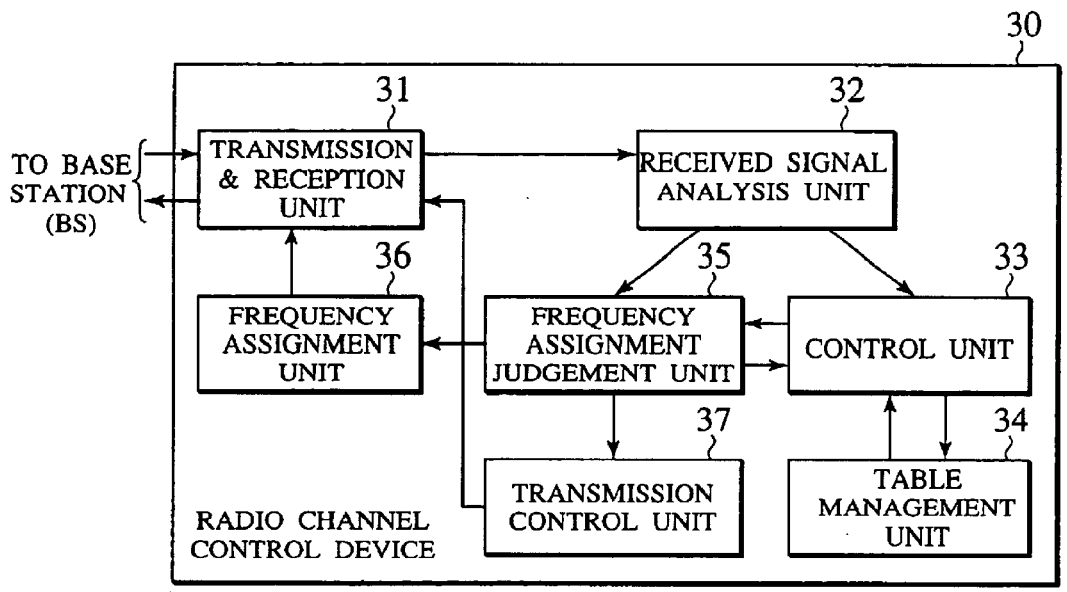

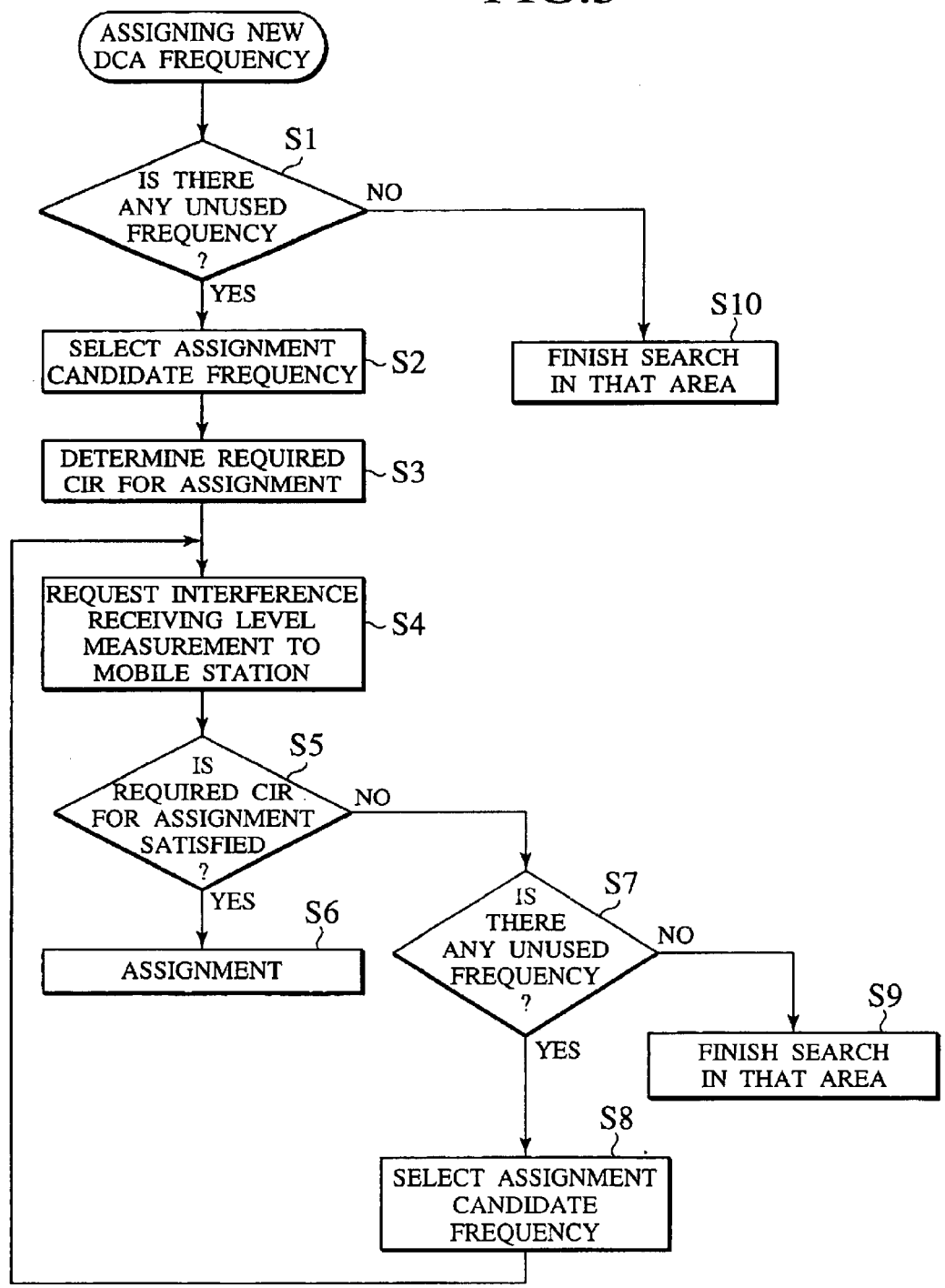

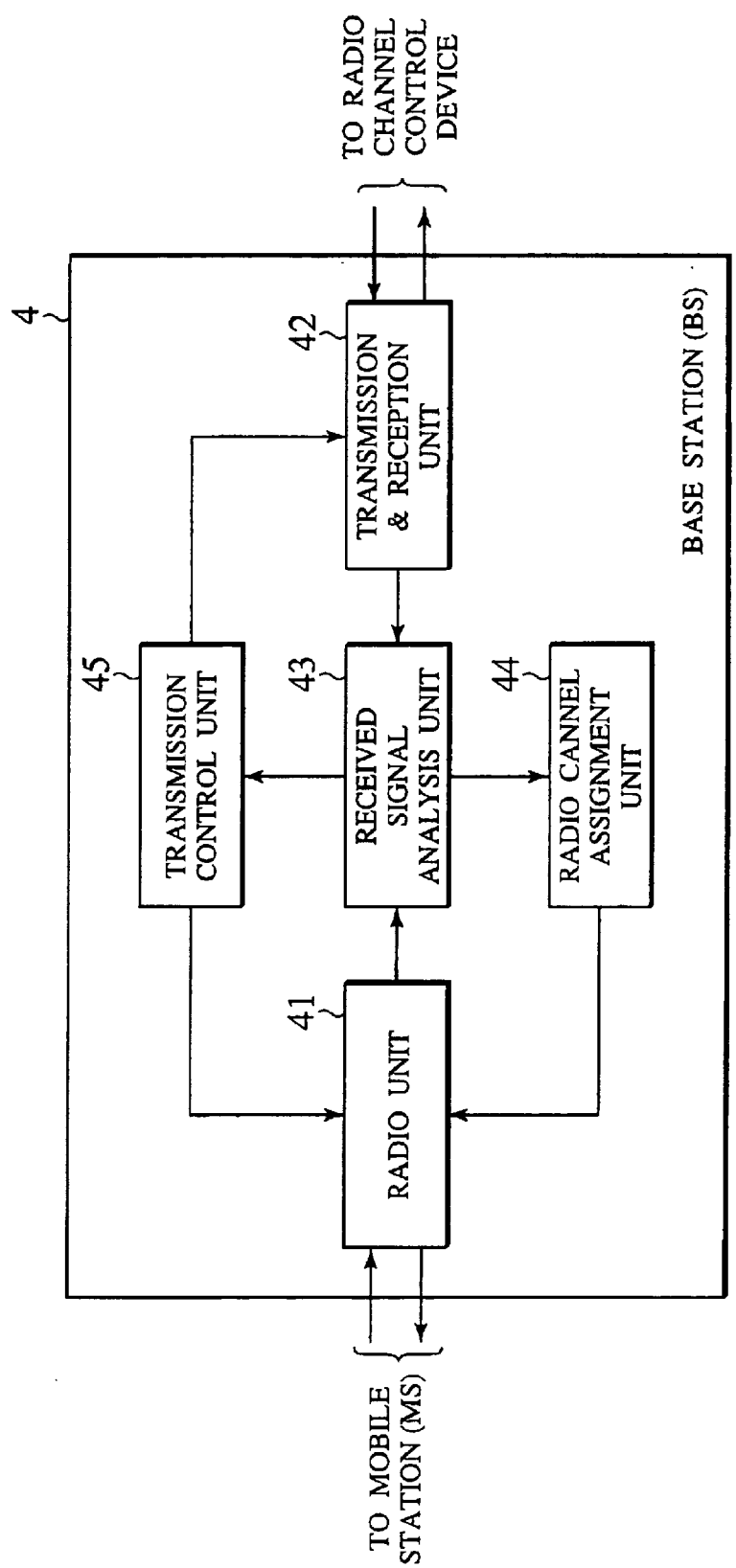

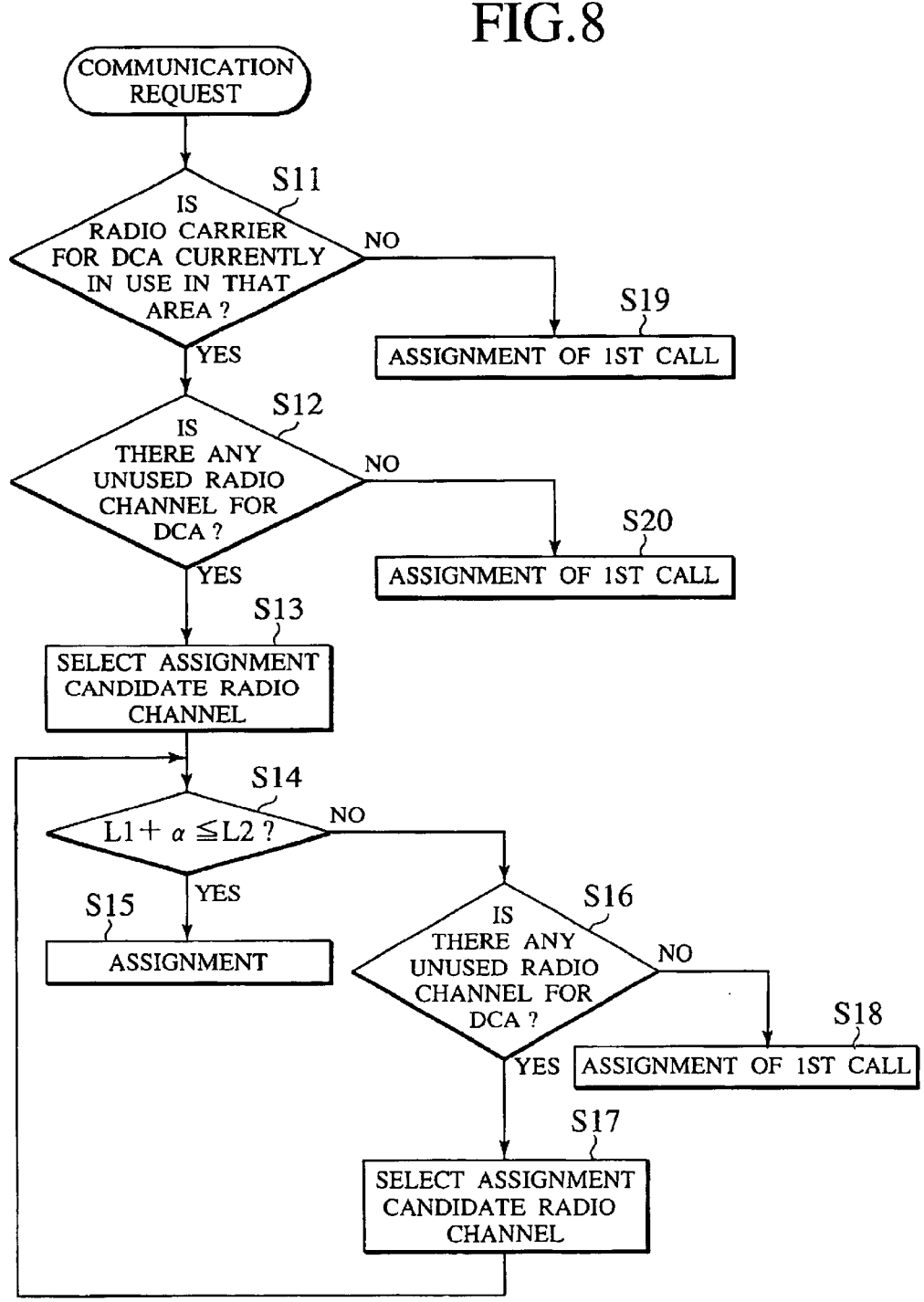

RADIO LINE ALLOCATION JUDGING METHOD IN MOBILE COMMUNICATION SYSTEM AND RADIO LINE

TECHNICAL FIELD

The present invention relates to a radio channel assignment judgement method and a radio channel control device in a mobile communication system using an autonomous distributed type channel selection scheme in which whether an assignment of a frequency is possible or not is judged according to a receiving level of a level measurement channel at a mobile station in a mobile communication network, and to a radio channel assignment judgement method and a radio channel control device in a mobile communication system using an autonomous distributed control type channel selection scheme in which a plurality of radio channels are formed in a radio carrier by time division multiplexing the radio carrier and the radio channels are assigned respectively to a plurality of mobile stations.

BACKGROUND ART

The frequency assignment in the Personal Digital Cellular (PDC) scheme by which services are currently provided in Japan can be operated by the following two methods. One is the Fixed Channel Assignment (FCA) scheme. This is a scheme in which propagation characteristics and traffic distributions are estimated in advance using actual measurements or theoretical calculations, and frequencies are arranged to each base station fixedly such that a required CIR for frequency assignment is satisfied at an area edge.

Another one is the Dynamic Channel Assignment (DCA) scheme. This is a scheme in which a common frequency that is available to all base stations is provided in the system, and this frequency is assigned in the case where there is no unused frequencies for the FCA. Unlike the FCA, the DCA is a scheme for assigning frequencies adaptively according to a state of frequency utilization in the surrounding at a time of assignment.

As described, the FCA arranges frequencies on an assumption that a frequency will be assigned to a mobile station at an area edge, whereas the DCA judges whether an assignment is possible or not according to the identical frequency interference condition at the base station and the mobile station at a time of assignment in general so that it is expected to have a good frequency reuse efficiency but it has a problem in that a communication quality can be largely affected in conjunction with a change of the radio signal propagation environment depending on a moving direction of the mobile station after the assignment.

For example, a mobile station to which a frequency is assigned by the DCA immediately below the base station will have a high receiving level for desired signals from the base station, so that the assignment is possible even when the identical frequency interference level is high. However, if this mobile station moves away from the base station after the assignment, the receiving level of the desired signals will obviously decrease so that there is a possibility for becoming more easily affected by the identical frequency interference.

On the other hand, in the case of carrying out the radio channel assignment by the autonomous distributed type DCA in the TDMA scheme, there is a need for a mobile station of the second call in the identical radio carrier to measure the interference level by specifying a slot, but it is difficult to measure the interference level of the assignment candidate radio channel before establishing synchronization with the base station, so that the assignment is made without measuring the interference level in general. For this reason, it is currently customary to adopt the operation in which a margin with respect to the required CIR (Carrier-to-Interference Ratio) for assignment is set large at a time of assigning the first call such that the mobile stations of the second and subsequent calls can be connected even under the worst condition.

As described, in the conventional TDMA mobile communication scheme, the radio channel is assigned by setting a margin with respect to the required CIR for assignment large at a time of assigning the radio channel to the first call such that the mobile stations of the second and subsequent calls can be connected even under the worst condition, rather than measuring the interference level with respect to the mobile station of the second call in the identical radio carrier, so that there is a problem in that the frequency utilization efficiency is degraded.

DISCLOSURE OF THE INVENTION

An object of the present invention lies in providing a radio channel assignment judgement method and a radio channel control device in a mobile communication system, capable of preventing a rapid tolerance degradation with respect to the identical frequency interference associated with a degradation of a receiving level of a communication channel that is caused, for example, by a moving of the mobile station.

Also, another object of the present invention lies in providing a radio channel assignment judgement method and a radio channel control device in a mobile communication system, which can assign radio channels of a stable quality to mobile stations of the second and subsequent called without causing any degradation of the frequency utilization frequency in the autonomous distributed control type channel selection scheme of the TDMA mobile communication scheme.

The present invention provides, in a radio channel control device of a mobile communication system using an autonomous distributed type channel selection scheme in which whether an assignment of a frequency/radio channel is possible or not is judged according to a receiving level of a level measurement channel at a mobile station, a radio channel assignment judgement method characterized by: storing and managing an optimal carrier-to-interference ratio (CIR) to be used as a threshold in judging whether the assignment of the frequency/radio channel is possible or not, in correspondence to each value that can be taken by the receiving level of the level measurement channel at the mobile station, in a table in advance; receiving a communication request and a measurement result of the receiving level of the level measurement channel in a radio zone that is a target of the communication request, that are transmitted from the mobile station at a time of making the communication request; and adaptively selecting the optimal carrier-to-interference ratio (CIR) that is corresponding to a received receiving level measurement result from said table, and judging whether the assignment of the frequency/radio channel is possible or not according to a selected carrier-to-interference ratio (CIR).

Also, the present invention is characterized by selecting an unused assignment candidate frequency/radio channel, requesting the mobile station to measure an interference receiving level of a selected assignment candidate frequency/radio channel and transmit a measurement result of the interference receiving level, judging whether a received interference receiving level satisfies the optimal carrier-to-interference ratio (CIR) selected from said table or not, and assigning the selected assignment candidate frequency/radio channel if the received interference receiving level satisfies the optimal carrier-to-interference ratio (CIR) selected from said table, when the communication request and the measurement result of the receiving level of the level measurement channel are received from the mobile station.

The present invention further provides a radio channel control device of a mobile communication system using an autonomous distributed type channel selection scheme in which whether an assignment of a frequency/radio channel is possible or not is judged according to a receiving level of a level measurement channel at a mobile station, the radio channel control device characterized by having: a table for storing and managing an optimal carrier-to-interference ratio (CIR) to be used as a threshold in judging whether the assignment of the frequency/radio channel is possible or not, in correspondence to each value that can be taken by the receiving level of the level measurement channel at the mobile station, in advance; a reception unit for receiving a communication request and a measurement result of the receiving level of the level measurement channel in a radio zone that is a target of the communication request, that are transmitted from the mobile station at a time of making the communication request; and a judgement unit for adaptively selecting the optimal carrier-to-interference ratio (CIR) that is corresponding to a received receiving level measurement result from said table, and judging whether the assignment of the frequency/radio channel is possible or not according to a selected carrier-to-interference ratio (CIR).

Also, the present invention is characterized by further having an assignment unit for selecting an unused assignment candidate frequency/radio channel, requesting the mobile station to measure an interference receiving level of a selected assignment candidate frequency/radio channel and transmit a measurement result of the interference receiving level, judging whether a received interference receiving level satisfies the optimal carrier-to-interference ratio (CIR) selected from said table or not, and assigning the selected assignment candidate frequency/radio channel if the received interference receiving level satisfies the optimal carrier-to-interference ratio (CIR) selected from said table, when the communication request and the measurement result of the receiving level of the level measurement channel are received from the mobile station.

The present invention further provides, in a radio channel control device of a mobile communication system using a TDMA mobile communication scheme in which a plurality of radio channels are formed in a radio carrier by time division multiplexing the radio carrier and each one of a plurality of mobile stations uses a respective radio channel, a radio channel assignment judgement method characterized by: receiving a communication request and a measurement result of a receiving level of a level measurement channel in a radio zone that is a target of the communication request, that are transmitted from one mobile station at a time of making the communication request; and judging whether there is another mobile station that is carrying out communication by a radio channel in an identical radio carrier as a radio channel to be assigned to said one mobile station or not, and if there is said another mobile station, selecting an unused assignment candidate radio channel while comparing a control frequency receiving level in a radio zone used for communication at said another mobile station and the receiving level of the level measurement channel at said one mobile station, and judging an assignment of a radio channel to said one mobile station according to a comparison result.

Also, the present invention is characterized in that the judging step makes a request to said another mobile station to measure the control frequency receiving level in the radio zone used for communication and transmit a measurement result of the control frequency receiving level, receives the control frequency receiving level measured and transmitted by said another mobile station in response to the request, and compares a received control frequency receiving level and the receiving level of the level measurement channel at said one mobile station.

Also, the present invention is characterized by assigning a selected unused assignment candidate radio channel to said one mobile station, if the receiving level of the level measurement channel at said one mobile station is greater than the control frequency receiving level in the radio zone used for communication at said another mobile station by a prescribed value or more at the judging step.

The present invention further provides a radio channel control device of a mobile communication system using a TDMA mobile communication scheme in which a plurality of radio channels are formed in a radio carrier by time division multiplexing the radio carrier and each one of a plurality of mobile stations uses a respective radio channel, a radio channel control device characterized by having: a reception unit for receiving a communication request and a measurement result of a receiving level of a level measurement channel in a radio zone that is a target of the communication request, that are transmitted from one mobile station at a time of making the communication request; and a judgement unit for judging whether there is another mobile station that is carrying out communication by a radio channel in an identical radio carrier as a radio channel to be assigned to said one mobile station or not, and if there is said another mobile station, selecting an unused assignment candidate radio channel while comparing a control frequency receiving level in a radio zone used for communication at said another mobile station and the receiving level of the level measurement channel at said one mobile station, and judging an assignment of a radio channel to said one mobile station according to a comparison result.

Also, the present invention is characterized in that the judgement unit makes a request to said another mobile station to measure the control frequency receiving level in the radio zone used for communication and transmit a measurement result of the control frequency receiving level, receives the control frequency receiving level measured and transmitted by said another mobile station in response to the request, and compares a received control frequency receiving level and the receiving level of the level measurement channel at said one mobile station.

Also, the present invention is characterized by further having an assignment unit for assigning a selected unused assignment candidate radio channel to said one mobile station, if the receiving level of the level measurement channel at said one mobile station is greater than the control frequency receiving level in the radio zone used for communication at said another mobile station by a prescribed value or more at the judgement unit.

BRIEF DESCRIPTION OF THE DRAWINGS

FIG. 1 is a block diagram showing a configuration of a mobile station in a mobile communication system of the first and second embodiments of the present invention.

FIG. 2 is a block diagram showing a configuration of a base station in a mobile communication system of the first embodiment of the present invention.

FIG. 3 is a block diagram showing a configuration of a radio channel control device in a mobile communication system of the first embodiment of the present invention.

FIG. 4 is a diagram showing a configuration of a required CIR for frequency assignment table managed in a table management unit in the radio channel control device of FIG. 3.

FIG. 5 is a flow chart showing a processing procedure of a radio channel assignment judgement method in a mobile communication system of the first embodiment of the present invention.

FIG. 6 is a block diagram showing a configuration of a base station in a mobile communication system of the second embodiment of the present invention.

FIG. 8 is a flow chart showing a processing procedure of a radio channel assignment judgement method in a mobile communication system of the second embodiment of the present invention.

BEST MODE FOR CARRYING OUT THE INVENTION

Figure 7:
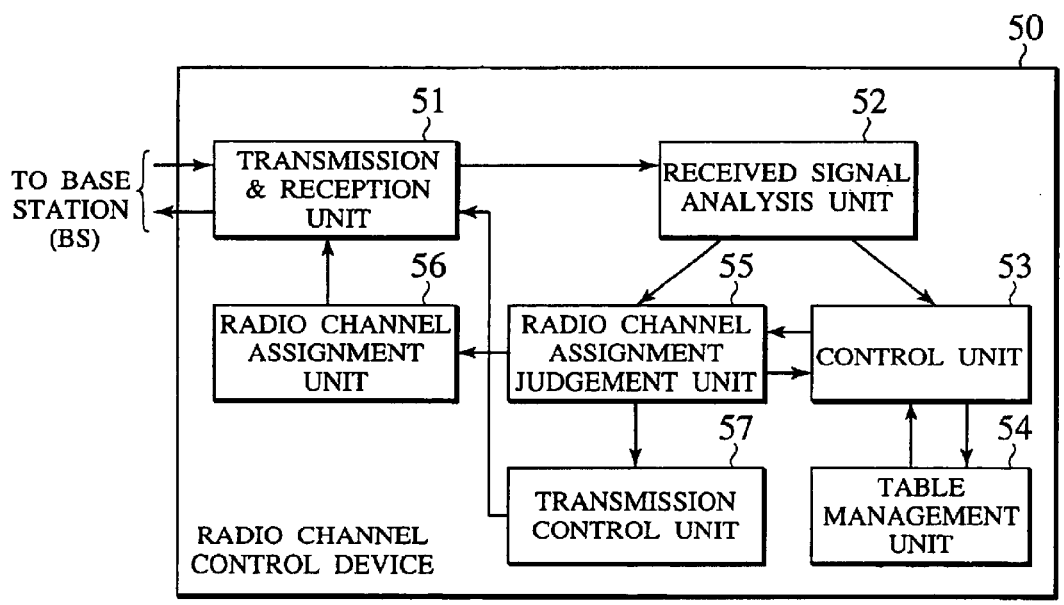
FIG. 7 is a block diagram showing a configuration of a radio channel control device in a mobile communication system of the second embodiment of the present invention.

First, with references to FIG. 1 to FIG. 5, the first embodiment of a radio channel assignment judgement method and a radio channel control device of the present invention will be described.

FIG. 1 shows a configuration of a mobile station (MS) 1 in a mobile communication system of the first embodiment of the present invention. The mobile station 1 of FIG. 1 comprises: a radio unit 11 for carrying out modulation/demodulation and encoding/decoding of transmission/reception signals in the mobile station 1; a received signal analysis unit 12 for analyzing whether a signal received from a base station is a level measurement request or a frequency assignment signal; a level measurement unit 13 for measuring a downlink receiving level from the base station to the mobile station 1; and a transmission control unit 14 for carrying out a transmission control when a transmission signal is generated as a result of an analysis by the received signal analysis unit 12 or the level measurement unit 13 or when a transmission signal is generated by a signal generation unit (not shown) inside the mobile station 1. More specifically, the level measurement unit 13 measures a level of a frequency or a control frequency specified by a radio channel control device that is connected to the base station.

FIG. 2 shows a configuration of a base station (BS) 2 to be connected with the mobile station 1 shown in FIG. 1 in the mobile communication system of the first embodiment. The base station 2 of FIG. 2 comprises: a radio unit 21 for carrying out modulation/demodulation and encoding/decoding of transmission/reception signals of the base station with respect to a radio section; a transmission and reception unit 22 connected to a radio channel control device, for carrying out transmission/reception of signals with the radio channel control device; a received signal analysis unit 23 for analyzing signals from the radio unit 21 and the transmission and reception unit 22; a frequency assignment unit 24 for assigning a notified frequency to the mobile station 1 when the received signal is analyzed as a frequency assignment signal from the radio channel control device at the received signal analysis unit 23; and a transmission control unit 25 for carrying out a transmission control when the received signal is analyzed as a level measurement request signal from the radio channel control device to the mobile station 1 or as a level measurement information from the mobile station 1 to the radio channel control device at the received signal analysis unit 23.

FIG. 3 shows a configuration of a radio channel control device 30 to which the base station 2 shown in FIG. 2 is connected through the transmission and reception unit 22 in the mobile communication system of the first embodiment. The radio channel control device 30 of FIG. 3 comprises: a transmission and reception unit 31 for carrying out transmission/reception of signals with the base station 2; a received signal analysis unit 32 for judging whether a signal from the base station 2 that is received at the transmission and reception unit 31 is a frequency assignment request or a level measurement information; a control unit 33 for judging whether there is any unused frequency for DCA or not with respect to the frequency assignment request that is given from the received signal analysis unit 32, and determining a required CIR for assignment from the level measurement information given from the received signal analysis unit 32; a table management unit 34 for managing a used frequency table and a required CIR for frequency assignment table to be used by the control unit 33; a frequency assignment judgement unit 35 for judging whether it is possible to assign an assignment candidate frequency selected by the control unit 33 or not; a frequency assignment unit 36 for carrying out a frequency assignment according to a result of the frequency assignment judgement unit 35; and a transmission control unit 37 for carrying out a transmission control of a level measurement request signal for the mobile station 1 that is generated at a time of the judgement by the frequency assignment judgement unit 35. Note that the required CIR for assignment to be used at a time of the judgement at the frequency assignment judgement unit 35 is acquired from the control unit 33, and the downlink receiving level information is acquired from the received signal analysis unit 32.

FIG. 4 shows a configuration of the required CIR for frequency assignment table that is managed by the table management unit 34. In the required CIR for frequency assignment table shown in FIG. 4, a value of an optimal required CIR for frequency assignment is stored and managed in correspondence to a value of the receiving level of the level measurement channel that is acquired from the mobile station 1.

Next, with reference to FIG. 5, a processing procedure of the radio channel assignment judgement method in the first embodiment, or more specifically an operation of the radio channel control device 30 will be described.

At a time of making a communication request, the mobile station 1 measures a receiving level of a level measurement channel in a radio zone (area) in which the communication request is to be made, and transmits the communication request along with this measurement result to the mobile communication network. When the communication request from the mobile station 1 is received along with the measurement result of the receiving level of the level measurement channel, the base station 2 transmits these communication request and receiving level measurement result to the radio channel control device 30 through the transmission and reception unit 22.

When the above described communication request and receiving level measurement result are received, the radio channel control device 30 first checks whether there is any unused frequency for DCA or not (step S1). In the case where there is no unused frequency for DCA, a frequency search in that area is finished (step S10). In the case where there is an unused frequency for DCA, an assignment candidate frequency for DCA is selected (step S2).

The radio channel control device 30 refers to the required CIR for frequency assignment table of the mobile station 1 shown in FIG. 4 according to a value of the receiving level measurement result of the level measurement channel at the mobile station 1 that is received along with the above described communication request, and selects a required CIR for assignment corresponding to a value of that receiving level measurement result (step S3).

Next, the radio channel control device 30 makes an interference receiving level measurement request for the above described assignment candidate frequency with respect to the mobile station 1, and acquires its value (step S4). Then, the radio channel control device 30 judges whether a value of this acquired interference receiving level measurement result satisfies the required CIR for assignment that is selected from the required CIR for frequency assignment table at the step S3, or not (step S5). In the case where that interference receiving level measurement result satisfies the required CIR for assignment, this frequency is assigned (step S6). Also, in the case where that interference receiving level measurement result does not satisfy the required CIR for assignment, whether there is any unused frequency or not is checked further (step S7), and if there is an unused frequency, an assignment candidate frequency for DCA is selected (step S8) and the operation returns to the step S4 to carry out the same processing. Such a frequency search is repeated until an assignment possible frequency can be found, and if an assignment possible frequency is found and that frequency satisfies the required CIR for assignment then than frequency is assigned, whereas if there is no unused frequency or no frequency that satisfies the required CIR for assignment, the frequency search in that area is finished (step S9).

By carrying out the above processing, it becomes possible to realize the frequency assignment that accounts for a tolerance with respect to the identical frequency interference after the frequency assignment.

As described above, according to the first embodiment of the present invention, the radio channel control device is storing and managing the optimal required CIR for frequency assignment in correspondence to the receiving level of the level measurement channel at the mobile station in a table, and upon receiving the communication request from the mobile station along with the receiving level measurement result, adaptively selects the optimal required CIR for frequency assignment that is corresponding to this receiving level measurement result from the table, and judges whether the assignment of the frequency is possible or not according to this selected required CIR for frequency assignment, so that it becomes possible to prevent a rapid tolerance degradation with respect to the identical frequency interference associated with a degradation of the desired signal receiving level of a communication channel that is caused, for example, by a moving of the mobile station to which the frequency is assigned at a location where the downlink receiving level is high.

Note that, in the above description, the first embodiment has been described as a method and a device for carrying out the frequency assignment judgement, but it is also possible to realize a method and a device for carrying out a radio channel assignment judgement by replacing a frequency with a radio channel in the above description.

Next, with references to FIG. 6 to FIG. 8, the second embodiment of a radio channel assignment judgement method and a radio channel control device of the present invention will be described.

In the mobile communication system of the second embodiment of the present invention, the configuration of the mobile station 1 is the same as that shown in FIG. 1. However, in the second embodiment, the radio unit 11 carries out modulation/demodulation and encoding/decoding of transmission/reception signals in the mobile station, the received signal analysis unit 12 analyzes whether a signal received at the radio unit 11 is a level measurement request signal or a radio channel assignment signal, the level measurement unit 13 for measuring a downlink receiving level measures a receiving level of a radio channel or a control frequency specified by the radio channel control device, and the transmission control unit 14 carries out a transmission control when a transmission signal is generated as a result of an analysis by the received signal analysis unit 12 or the level measurement unit 13 or when a transmission signal is generated by a signal generation unit inside the mobile station.

FIG. 6 shows a configuration of a base station 4 to be used together with the mobile station 1 shown in FIG. 1 in the mobile communication system of the second embodiment. The base station 4 of FIG. 6 comprises: a radio unit 41 for carrying out modulation/demodulation and encoding/decoding of transmission/reception signals of the base station with respect to a radio section; a transmission and reception unit 42 for carrying out transmission/reception of signals with the radio channel control device; a received signal analysis unit 43 for analyzing signals from the radio unit 41 and the transmission and reception unit 42; a radio channel assignment unit 44 for assigning a notified radio channel to the mobile station 1 when the received signal is analyzed as a radio channel assignment signal from the radio channel control device at the received signal analysis unit 43; and a transmission control unit 45 for carrying out a transmission control when the received signal is analyzed as a level measurement request signal from the radio channel control device to the mobile station 1 or as a level measurement signal from the mobile station 1 to the radio channel control device at the received signal analysis unit 43.

FIG. 7 shows a configuration of a radio channel control device 50 to which the base station 4 shown in FIG. 6 is connected through the transmission and reception unit 42 in the mobile communication system of the second embodiment. The radio channel control device 50 of FIG. 7 comprises: a transmission and reception unit 51 for carrying out transmission/reception of signals with the base station 4; a received signal analysis unit 52 for judging whether a signal received at the transmission and reception unit 51 is a radio channel assignment request for the second call or a level measurement information; a control unit 53 for judging whether there is any unused radio channel in the currently used radio carrier or not and whether there is an unused radio carrier or not when it is judged as the radio channel assignment request for the second call as a result of the analysis by the received signal analysis unit 52, a table management unit 54 for managing a used radio channel table to be used by the control unit 53; a radio channel assignment judgement unit 55 for judging whether it is possible to assign an assignment candidate radio channel selected by the control unit 53 or not according to the level measurement information received at the received signal analysis unit 52; a radio channel assignment unit 56 for carrying out a radio channel assignment according to a result of the radio channel assignment judgement unit 55; and a transmission control unit 57 for carrying out a transmission control of a level measurement request signal for the mobile station 1 that is generated at a time of the judgement by the radio channel assignment judgement unit 55. Note that, in the case where the judgement result at the radio channel assignment judgement unit 55 indicates that the assignment is not possible, the control unit 53 notifies this fact and requests an extraction of a assignment candidate radio channel again.

Next, with reference to FIG. 8, a processing procedure of the radio channel assignment judgement method in the second embodiment, or more specifically an operation of the radio channel control device 50 will be described.

At a time of making a communication request, the mobile station 1 measures a receiving level of a level measurement channel in a radio zone (area) in which the communication request is to be made, and transmits the communication request along with this measurement result to the radio channel control device 50 through the base station 4. When the communication request from the mobile station 1 is received along with the receiving level measurement result of the level measurement channel, the radio channel control device 50 judges whether a radio carrier for DCA (Dynamic Channel Assignment) is already assigned in that are or not, that is whether there is another mobile station that is carrying out communication using a radio channel in the identical radio carrier as a radio channel to be assigned to the above described mobile station 1 or not (step S11). In the case where a radio carrier for DCA is not assigned, an assignment of a radio channel to the first call is carried out with respect to that mobile station 1 by using a new radio carrier for DCA (step S19). Note that, in this assignment of a radio channel to the mobile station of the first call, the radio channel control device 50 that received the communication request from the mobile station 1 selects an assignment candidate radio channel and carries out the assignment when this selected radio channel satisfies the required CIR for assignment at the base station 4 and the mobile station 1.

Also, in the case where a radio channel for DCA is already assigned to the another mobile station of the first call by the judgement at the step S11, whether there is an radio channel in the already assigned radio carrier or not is judged (step S12). In the case where there is an unused radio channel, an unused assignment candidate radio channel for that mobile station 1 is selected by regarding that mobile station 1 as the mobile station of the second call (step S13).

Then, a control frequency receiving level L1 in the radio zone used for communication at the another mobile station of the first call and a receiving level L2 of the level measurement channel at this mobile station 1 of the second call are compared, and whether $L1+\alpha \leq L2$ holds or not is judged (step S14). As a result of this comparison, when the receiving level L2 of the level measurement channel at this mobile station 1 of the second call is greater than the control frequency receiving level L1 in the radio zone used for communication at the another mobile station of the first call by a prescribed margin a or more, the above described selected radio channel is assigned to this mobile station 1 (step S15).

In the case where $L1+\alpha>L2$ as a result of the comparison at the step S14, that is when the receiving level L2 of the level measurement channel at this mobile station 1 of the second call is not greater than the control frequency receiving level L1 in the radio zone used for communication at the another mobile station of the first call by a prescribed margin a or more, the radio channel control device 50 checks whether there is an unused radio channel in another currently used (or remaining) radio carrier for DCA or not (step S16). In the case where there is an unused radio channel for DCA, an assignment possible radio channel is selected (step S17) and the processing from the step S14 on is repeated for this selected radio channel. In the case where an assignment possible radio channel cannot be detected in the already assigned radio carrier for DCA by this repetition, a new radio carrier for DCA is assigned by regarding this mobile station 1 as the mobile station of the first call (step S18).

Also, in the case where there is no unused radio channel for DCA by the judgement at the step S12, a new radio channel for DCA is assigned by regarding this mobile station 1 as the mobile station of the first call (step S20).

Note that, in the judgement as to whether an assignment is possible or not in the above described processing, the control frequency receiving level at the mobile station of the first call and the receiving level of the level measurement channel at the mobile station of the second call are compared, but instead of the control frequency receiving level at the mobile station of the first call that is used in that case, it is also possible to use the receiving level of the communication channel at the mobile station of the first call.

Also, the receiving level L2 of the level measurement channel at the mobile station 1 of the second call that is used in the comparison at the step S14 is what is transmitted from this mobile-station 1 to the radio channel control device 50 along with the communication request, and the control frequency receiving level L1 in the radio zone used for communication at the another mobile station of the first call is the measured control frequency receiving level L1 received from the another mobile station as the radio channel control device 50 requested the another mobile station to measure and return the control frequency receiving level L1 in the radio zone used for communication.

As described above, according to the second embodiment of the present invention, the radio channel control device receives the communication request from one mobile station along with the receiving level measurement result of the level measurement channel in the radio zone, judges whether there is another mobile station that is carrying out communication by a radio channel in the identical radio carrier as a radio channel to be assigned to that one mobile station or not, compares the control frequency receiving level in the radio zone used for communication at another mobile station and the receiving level of the level measurement channel at that one mobile station in the case where there is another mobile station, and judges an assignment of the radio channel to that one mobile station according to this comparison result. Consequently, there is no need to set a large margin with respect to the required CIR for assignment at a time of assigning a radio channel to the first call by accounting for assignment to mobile stations of the second and subsequent calls, and it becomes possible to assign radio channels of a stable quality even to mobile stations of the second and subsequent calls without lowering the frequency utilization efficiency.

What is claimed is:

1. A radio channel assignment judgement method at a radio channel control device of a mobile communication system using an autonomous distributed type channel selection scheme in which whether an assignment of a frequency/radio channel is possible or not is judged according to a receiving level of a level measurement channel at a mobile station, the radio channel control device being provided separately from base stations and mobile stations and connected with the base stations, the radio channel assignment judgement method comprising the steps of:

storing and managing an optimal carrier-to-interference ratio (CIR) to be used as a threshold in judging whether the assignment of the frequency/radio channel is possible or not, in correspondence to each value that can be taken by the receiving level of the level measurement channel at the mobile station, in a table in advance;

receiving a communication request and a measurement result of the receiving level of the level measurement channel in a radio zone that is a target of the communication request, that are transmitted from the mobile station at a time of making the communication request; and adaptively selecting the optimal carrier-to-interference ratio (CIR) that is corresponding to a received receiving level measurement result from said table, and judging whether the assignment of the frequency/radio channel is possible or not according to a selected carrier-to-interference ratio (CIR).

2. The radio channel assignment judgement method as described in claim 1, characterized by selecting an unused assignment candidate frequency/radio channel, requesting the mobile station to measure an interference receiving level of a selected assignment candidate frequency/radio channel and transmit a measurement result of the interference receiving level, judging whether a received interference receiving level satisfies the optimal carrier-to-interference ratio (CIR) selected from said table or not, and assigning the selected assignment candidate frequency/radio channel if the received interference receiving level satisfies the optimal carrier-to-interference ratio (CIR) selected from said table, when the communication request and the measurement result of the receiving level of the level measurement channel are received from the mobile station.

3. A radio channel control device of a mobile communication system using an autonomous distributed type channel selection scheme in which whether an assignment of a frequency/radio channel is possible or not is judged according to a receiving level of a level measurement channel at a mobile station, the radio channel control device being provided separately from base stations and mobile stations and connected with the base stations, the radio channel control device comprising:

a table for storing and managing an optimal carrier to-interference ratio (CIR) to be used as a threshold in judging whether the assignment of the frequency/radio channel is possible or not, in correspondence to each value that can be taken by the receiving level of the level measurement channel at the mobile station, in advance;

a reception unit for receiving a communication request and a measurement result of the receiving level of the level measurement channel in a radio zone that is a target of the communication request, that are transmitted from the mobile station at a time of making the communication request; and a judgement unit for adaptively selecting the optimal carrier-to-interference ratio (CIR) that is corresponding to a received receiving level measurement result from said table, and judging whether the assignment of the frequency/radio channel is possible or not according to a selected carrier-to-interference ratio (CIR).

4. The radio channel control device as described in claim 3, characterized by further having an assignment unit for selecting an unused assignment candidate frequency/radio channel, requesting the mobile station to measure an interference receiving level of a selected assignment candidate frequency/radio channel and transmit a measurement result of the interference receiving level, judging whether a received interference receiving level satisfies the optimal carrier-to-interference ratio (CIR) selected from said table or not, and assigning the selected assignment candidate frequency/radio channel if the received interference receiving level satisfies the optimal carrier-to-interference ratio (CIR) selected from said table, when the communication request and the measurement result of the receiving level of the level measurement channel are received from the mobile station.

5. A radio channel assignment judgement method at a radio channel control device of a mobile communication system using a TDMA mobile communication scheme in which a plurality of radio channels are formed in a radio carrier by time division multiplexing the radio carrier and each one of a plurality of mobile stations uses a respective radio channel, the radio channel control device being provided separately from base stations and mobile stations and connected with the base stations, the radio channel assignment judgement method by comprising the steps of:

receiving a communication request and a measurement result of a receiving level of a level measurement channel in a radio zone that is a target of the communication request, that are transmitted from one mobile station at a time of making the communication request; and judging whether there is another mobile station that is carrying out communication by a radio channel in an identical radio carrier as a radio channel to be assigned to said one mobile station or not, and if there is said another mobile station, selecting an unused assignment candidate radio channel while comparing a control frequency receiving level in a radio zone used for communication at said another mobile station and the receiving level of the level measurement channel at said one mobile station, and judging an assignment of a radio channel to said one mobile station according to a comparison result.

6. The radio channel assignment judgement method as described in claim 5, characterized in that the judging step makes a request to said another mobile station to measure the control frequency receiving level in the radio zone used for communication and transmit a measurement result of the control frequency receiving level, receives the control frequency receiving level measured and transmitted by said another mobile station in response to the request, and compares a received control frequency receiving level and the receiving level of the level measurement channel at said one mobile station.

7. The radio channel assignment judgement method as described in claim 5, characterized by assigning a selected unused assignment candidate radio channel to said one mobile station, if the receiving level of the level measurement channel at said one mobile station is greater than the control frequency receiving level in the radio zone used for communication at said another mobile station by a prescribed value or more at the judging step.

8. A radio channel control device of a mobile communication system using a TDMA mobile communication scheme in which a plurality of radio channels are formed in a radio carrier by time division multiplexing the radio carrier and each one of a plurality of mobile stations uses a respective radio channel, the radio channel control device being provided separately from base stations and mobile stations and connected with the base stations, the radio channel control device comprising:

a reception unit for receiving a communication request and a measurement result of a receiving level of a level measurement channel in a radio zone that is a target of the communication request, that are transmitted from one mobile station at a time of making the communication request; and a judgement unit for judging whether there is another mobile station that is carrying out communication by a radio channel in an identical radio carrier as a radio channel to be assigned to said one mobile station or not, and if there is said another mobile station, selecting an unused assignment candidate radio channel while comparing a control frequency receiving level in a radio zone used for communication at said another mobile station and the receiving level of the level measurement channel at said one mobile station, and judging an assignment of a radio channel to said one mobile station according to a comparison result.

9. The radio channel control device as described in claim 8, characterized in that the judgement unit makes a request to said another mobile station to measure the control frequency receiving level in the radio zone used for communication and transmit a measurement result of the control frequency receiving level, receives the control frequency receiving level measured and transmitted by said another mobile station in response to the request, and compares a received control frequency receiving level and the receiving level of the level measurement channel at said one mobile station.

10. The radio channel control device as described in claim 8, characterized by further having an assignment unit for assigning a selected unused assignment candidate radio channel to said one mobile station, if the receiving level of the level measurement channel at said one mobile station is greater than the control frequency receiving level in the radio zone used for communication at said another mobile station by a prescribed value or more at the judgement unit.

* * * * *